United States Patent [19]

Cindric

[11] Patent Number: 4,801,043
[45] Date of Patent: Jan. 31, 1989

[54] PARTS ORIENTOR & METHOD

[76] Inventor: Emil J. Cindric, 509 Huron Trail, Lake-in-the-Hills, Ill. 60102

[21] Appl. No.: 104,594

[22] Filed: Sep. 29, 1987

Related U.S. Application Data

[63] Continuation of Ser. No. 798,818, Nov. 18, 1985, abandoned.

[51] Int. Cl.$^4$ .............................................. B65G 47/14
[52] U.S. Cl. ........................................ 221/1; 198/388; 198/395; 198/399; 221/13; 221/173
[58] Field of Search ......................... 221/1, 9, 13, 173; 198/388, 395, 399

[56] References Cited

U.S. PATENT DOCUMENTS

| | | | |
|---|---|---|---|
| 2,251,158 | 7/1941 | Ogrodowy | 198/399 X |
| 2,759,589 | 8/1956 | Hall et al. | 221/173 |
| 2,997,202 | 8/1961 | Madeux | 221/173 X |

*Primary Examiner*—F. J. Bartuska
*Attorney, Agent, or Firm*—Charles F. Meroni, Jr.

[57] ABSTRACT

A parts orienting machine comprising a frame, a vertically actuated plunger reciprocating block mounted on the frame with a pair of side-by-side vertical passageways therein. One of the passageways is in periodic co-axial alignment with an inlet parts feeder chute for receiving disoriented piece parts on a one at a time basis. The other of the side-by-side vertical passageways being in periodic vertical alignment with a discharge chute for conveying oriented parts to the discharge chute. The reciprocating block has an axial passageway and an axially extending orientor shaft extends into the axial passageway. A vertically extending parts receiving nest is provided in the orientor shaft which nest is in periodic vertical alignment with the side-by-side vertical passageways. Mechanism is provided for reciprocating the reciprocating block back and forth in the axial passageway for alternatively aligning the nest with the inlet and outlet passageways. A sensor is provided for sensing whether a part received in the nest is properly oriented relative to other parts upon being received in the nest. A second mechanism is provided for rotating the orientor shaft and the nest when the part is received in an upside down disoriented position in the nest as the nest axially travels from its parts receiving position to its parts discharging position so the plunger can positively contact the oriented part to dislodge the oriented part from the nest into the discharge chute.

25 Claims, 6 Drawing Sheets

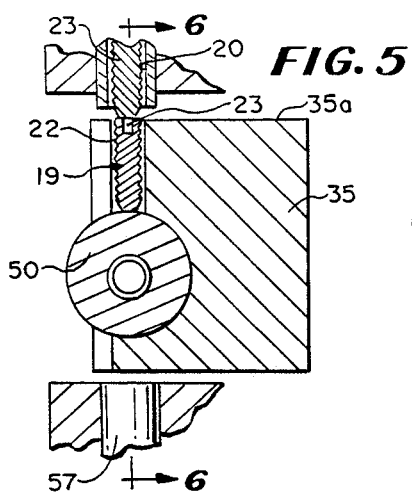
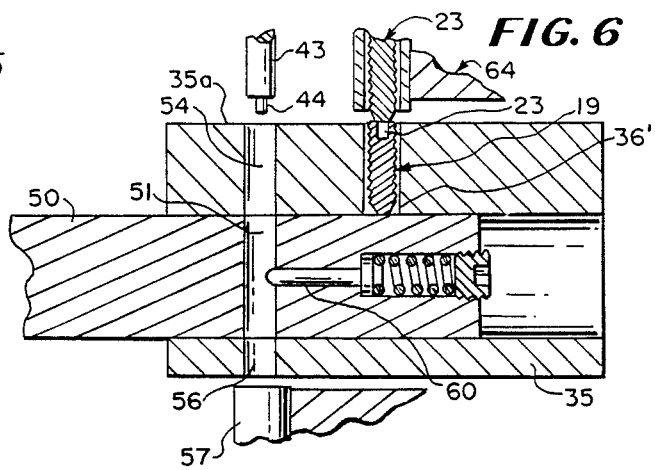
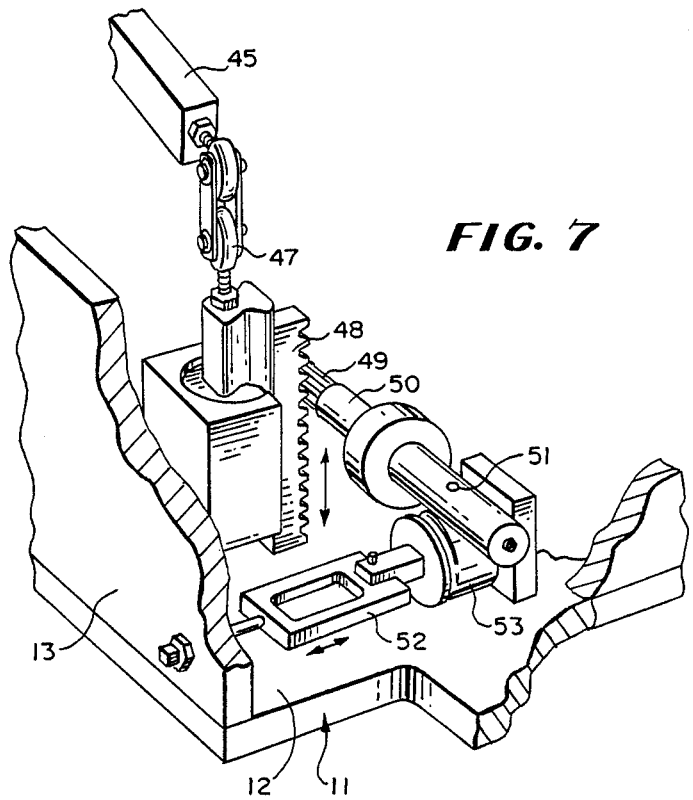
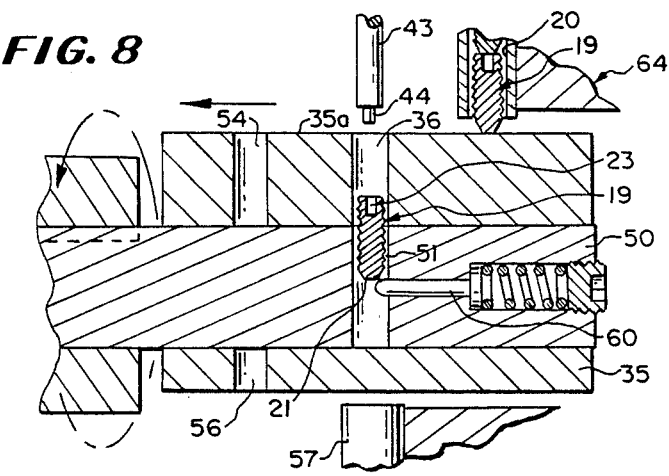

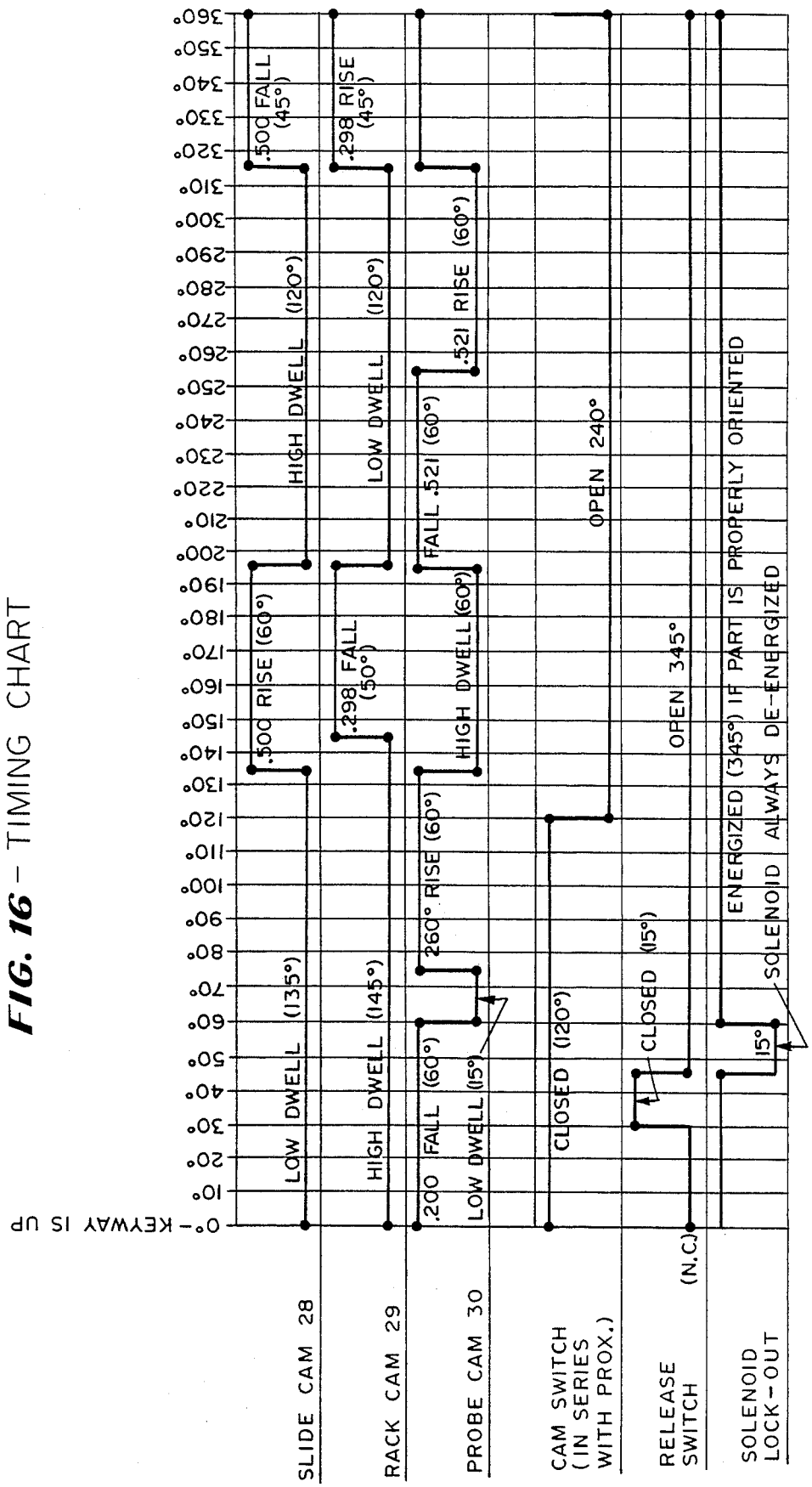
FIG. 16 – TIMING CHART

PARTS ORIENTOR & METHOD

The present application is a continuation of my earlier filed co-pending U.S. application U.S. Ser. No. 06/798,818 filed on Nov. 18, 1985, now abandoned.

BACKGROUND OF THE INVENTION

Field of the Invention

The present invention relates to a new and improved parts orienting machine and method of orienting parts. The new and improved machine and method can be operated at higher speeds and at a greater production rate than machines presently known.

According to important features of my invention, the new machine and method for orienting parts can be continuously operated in such a way that the parts are successively received in a nest and the relative position of the part is determined by a sensor. If it is determined that the part in the nest is properly oriented, the nest and the part loaded therein is moved to a discharge position and a plunger functions to forcibly push the part out of the nest and into a discharge chute. If it is determined that the part is improperly oriented in the nest, the nest is then rotated 180° before the plunger causes there oriented part to be serially unloaded from the nest into the discharge chute so that all of the parts are oriented in the same way relative to one another as the machine operation and the method are operated repetitively.

According to other features of my invention, I have provided a new and improved parts orienting machine having a plunger or punch that serves dual purposes: (1) it forces piece parts past an interference pin during its downward travel to eliminate the need for the piece part to free fall out of the nest during the machine cycle of 0° to 60°; and (2) during the low dwell (60°-75°) the end opposite of the probing tip is used to signal a proximity switch only if the piece part being probed is oriented with its recess on top.

Other features of my invention relate to providing a new and improved machine and method whereby the piece part is positively positioned throughout all escaping, probing, orienting, and discharging or expelling steps, from the time the piece part enters the nest until it is forced out of the nest into the discharge chute.

Still other features of my invention concern a new and improved orienting machine for orienting parts at higher speeds which has an electrical switching circuit and a solenoid activated lockout slide which have additional time (70° of rotation) 75° to 145° to perform their function because of the time (60° of rotation) required to bring the probe punch up to "home position" before a rack slide begins its downward travel.

Still other features of my invention concern a new and improved parts orienting machine where the machine operation enables the oriented piece part to be expelled at 120° while the horizontal slide dwell allows a new piece part to fall from the inlet chute into the nest provided in the shuttle block (195°-315°). This feature of my invention which provides a 120° dwell time serves two functions: the first being to provide ample time to permit the oriented piece part to be expelled; and the second being to permit the new piece part to fall into a pre-sensing position, anticipatory of being axially moved with the shuttle block to its sensing position.

Other features of my invention concern a new and improved parts orienting machine wherein the shuttle block or reciprocating block has a reciprocating motion which delivers the piece part to the orienting nest, and then returns empty to pick up a new piece part.

In the past, various types of parts orienting machines have been used in industry. One machine known to the inventor is an orienting machine which utilizes an indexing wheel which is known to be operated at speeds of roughly 45 units per minute as compared to the present machine which Is operable at speeds over 175 units per minute and it is believed that higher speeds are attainable with a higher speed gear motor such as a 500 R.P.M. motor. In the older type machines utilizing an indexing wheel, there was a tendency for the piece parts to jam or to become locked up in the indexing wheel and there was a tendency for these parts to resist free fall by gravity (after inversion) into a discharge chute and where there was no positive expulsion of the piece part from the so-called indexing wheel nest as contrasted with my machine and method herein disclosed.

According to yet other features of my invention, during the time the nest is being rotated to correctly orient a disoriented part, the shuttle block is in its return stroke period of operation for accepting a new part and further while the nest is being rotated to its original position (315°-360°), the shuttle block is in its escaping stroke delivering a new piece into the probe position.

It should further be noted that there were also other types of problems encountered in the use of prior art machines where an indexing wheel rotated about a stationary center since there was a tendency for piece parts carried in circumferentially spaced nests in the indexing wheel to become jammed at the inner and outer ends of the nests on the indexing wheel where the piece parts were not fully loaded into the nests or fully expelled from the nests as the indexing wheel was being indexed.

SUMMARY OF THE INVENTION

A parts orienting machine comprising a frame, a reciprocating block mounted on the frame with a pair of side-by-side vertically extending parts inlet and outlet passageways therein and reciprocal with said block, one of the passageways being in periodic co-axial alignment with an inlet parts feeder chute for receiving disoriented piece parts on a one at a time basis, the other of said side-by-side vertical passageways being in periodic vertical alignment with a discharge chute for conveying oriented parts to the discharge chute, a vertically actuatable plunger successively engageable in said side-by-side passageways, the shuttle block having an axial passageway, an axially extending orientor shaft extending into said axial passageway, a vertically extending parts receiving nest in said orientor shaft in periodic vertical alignment with the reciprocating side-by-side vertical passageways, means for reciprocating the shuttle block back and forth for successively aligning said nest with said inlet and outlet passageways, sensing means for sensing whether a part received from the feeder chute in said nest is properly oriented relative to other parts, means responsive to said sensing means for rotating said orientor shaft and said nest only when said part is received in an upside down disoriented position in said nest, and means for timed operation of said plunger enabling the plunger to assist in locating the part in the nest and discharging an oriented part from the nest.

A method of orienting parts where the parts are of a similar shape each having a head end and a tail end comprising the steps of successively placing parts into a nest, successively sensing each part to determine whether its ends are properly oriented in the nest, only rotating the nest to reorientate a disoriented part, and extending a plunger into the nest to discharge the oriented part therefrom in serial relation with the other parts.

BRIEF DESCRIPTION OF THE DRAWINGS

FIG. 5 is an enlarged fragmentary cross-sectional view of my machine shown in FIG. 3 taken on lines 5—5 looking in the direction indicated by the arrows;

FIG. 6 is an enlarged fragmentary cross-sectional view of my machine taken on line 6—6 looking in the direction indicated by the arrows shown in FIG. 5;

FIG. 7 is an enlarged fragmentary perspective view showing a mechanism for rotating the parts receiving nest;

FIG. 8 is an enlarged fragmentary cross-sectional view showing the way in which a part or set screw is received into the nest for orientation if disoriented;

FIG. 16 is a schematic view illustrating a timing chart showing the way in which the components interact during the various stages of operation.

DESCRIPTION OF THE PREFERRED EMBODIMENTS

Figure 1:
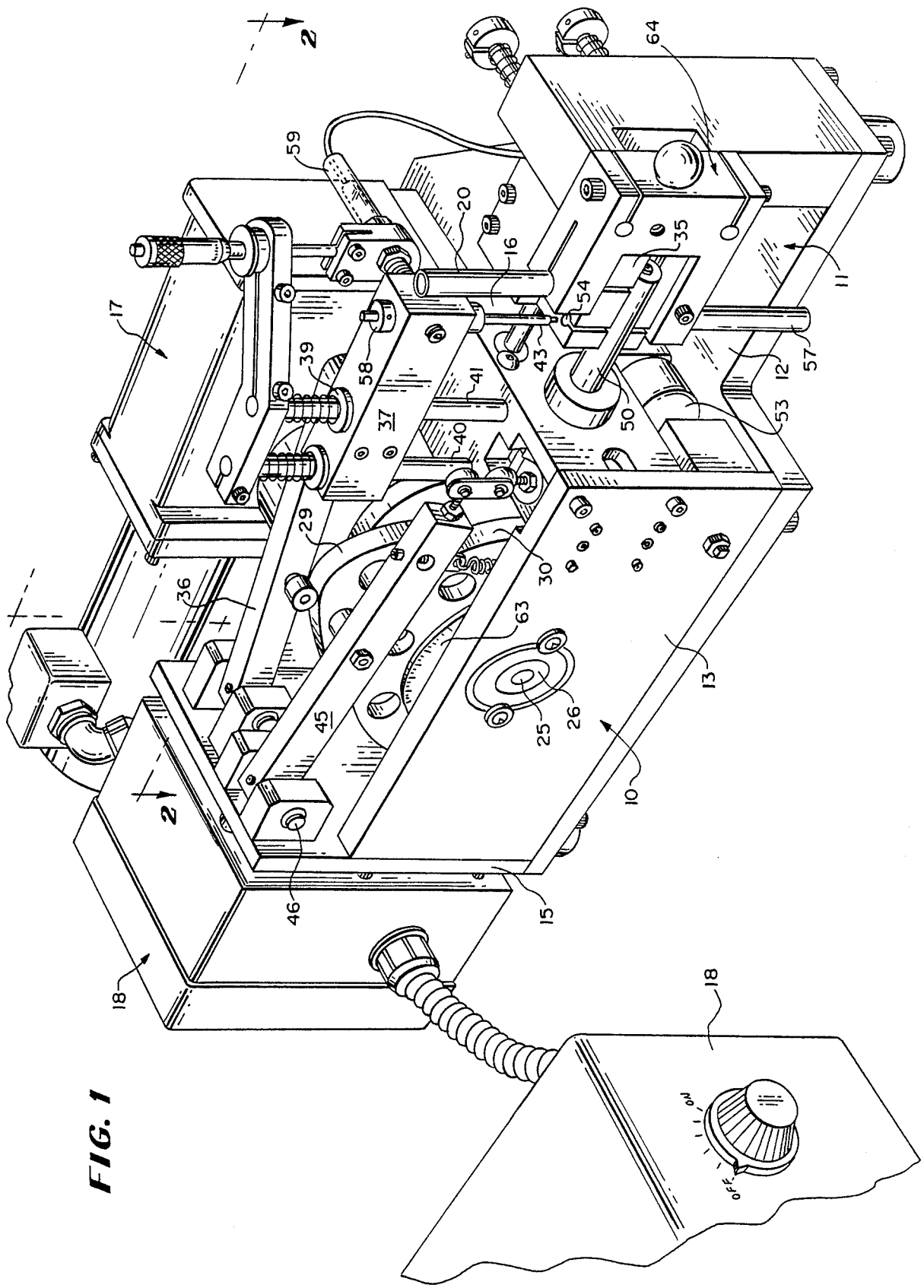
FIG. 1 is a fragmentary perspective view illustrating my new parts orienting machine.

The reference numeral 10 indicates generally my parts orienting machine. The machine 10 has a frame 11 which includes a base plate 12, side plates 13 and 14 (FIG. 2) and a rear plate 15, and a main bearing block 16 which are all secured by suitable fasteners to one another and to the base plate 12. Mounted on one side of the frame 11 is an electrically powered variable speed gear motor 17. To one side of the frame 11 is a control box 18 (FIG. 1) for regulating the operating speed of the parts orienting machine 10.

Figure 2:
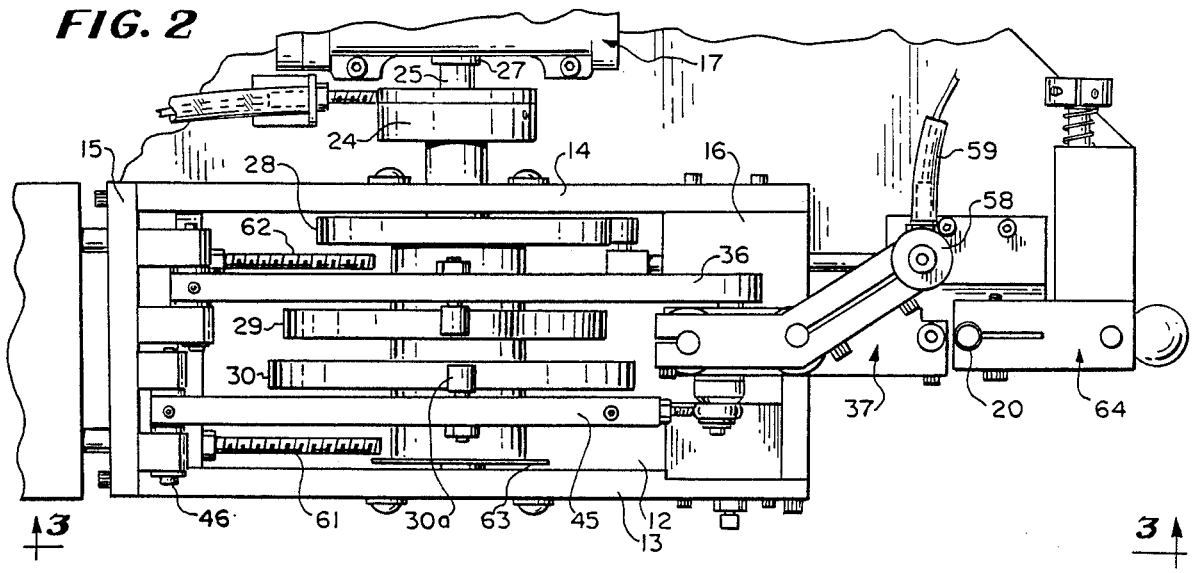
FIG. 2 is a fragmentary plan view taken on line 2—2 looking in the direction indicated by the arrows as seen in FIG. 1.

According to my invention, the reference numeral 10 indicated generally an independently controlled free-standing machine which positively accepts, shuttles, probes, orients, and drives out a cylindrical asymmetrical part or screw 19. The machine accepts the headless set screws 19 or other recessed parts out of a vibratory feeder bowl into a parts infeed tube or passageway 20. The parts or screws 19 are received into the tube 20 and are random oriented relative to one another. The machine 10 then orients the parts or screws 19 so that they all leave the machine having the same orientation. With set screws 19, they are all oriented so that a threaded end 21 leads the tail or drive end 22 and the drive end has a part recess 23 (FIG. 5). The parts or screws 19 are sequentially positively loaded into an orienting nest and then positively pushed out into a discharge chute 57. The infeed tube or passageway and the discharge chute 57 are mounted on a C-shaped tube holder and divertor structure 64 (FIG. 1)

The machine 10 is driven by the variable speed gear motor 17 which is indirectly connected through an overload or single revolution clutch 24 to the one and only drive shaft 25. The clutch is monitored for overload conditions should a jam occur, with a proximity switch mounted is a fail-safe position. The drive shaft 25 (FIG. 2) is mounted horizontally with two ball bearings 26 (FIG. 1) and 27 (FIG. 2) to opposing sides of a "box type" construction onto which all the other associated mechanics are mounted to.

Figure 4:
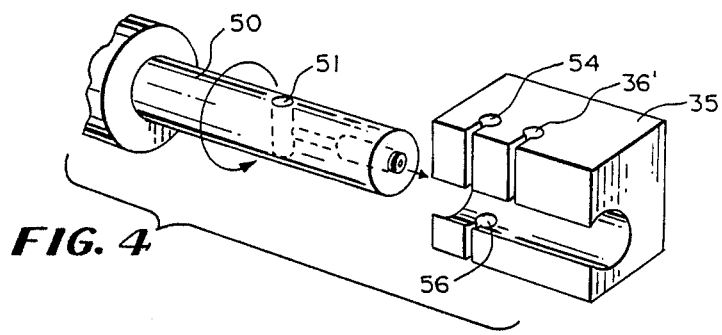
FIG. 4 is an enlarged fragmentary detail view showing the cooperation of a plunger with a part receiving nest on a parts receiving block.

There are three drive cams 28, 29, and 30 mounted between the ball bearings 26 and 27 on the drive shaft 25 that control all of the major motions. The three successive 15 drive cams 28, 29 and 30 are mounted in spaced relation on the shaft 25. The cam 28 is preferably 3⅜″ diameter and the cams 29 and 30 are preferably 4⅛″ diameter. The first drive cam 28 is operable to reciprocate a shuttle block 35 (FIG. 4). The second drive cam 29 is operable to move the plunger up and down. The third drive cam 30 is operable to rotate an orientor shaft 50 and its nest 51 to orient the part 19 when signalled by the sensor to do so.

Figure 3:
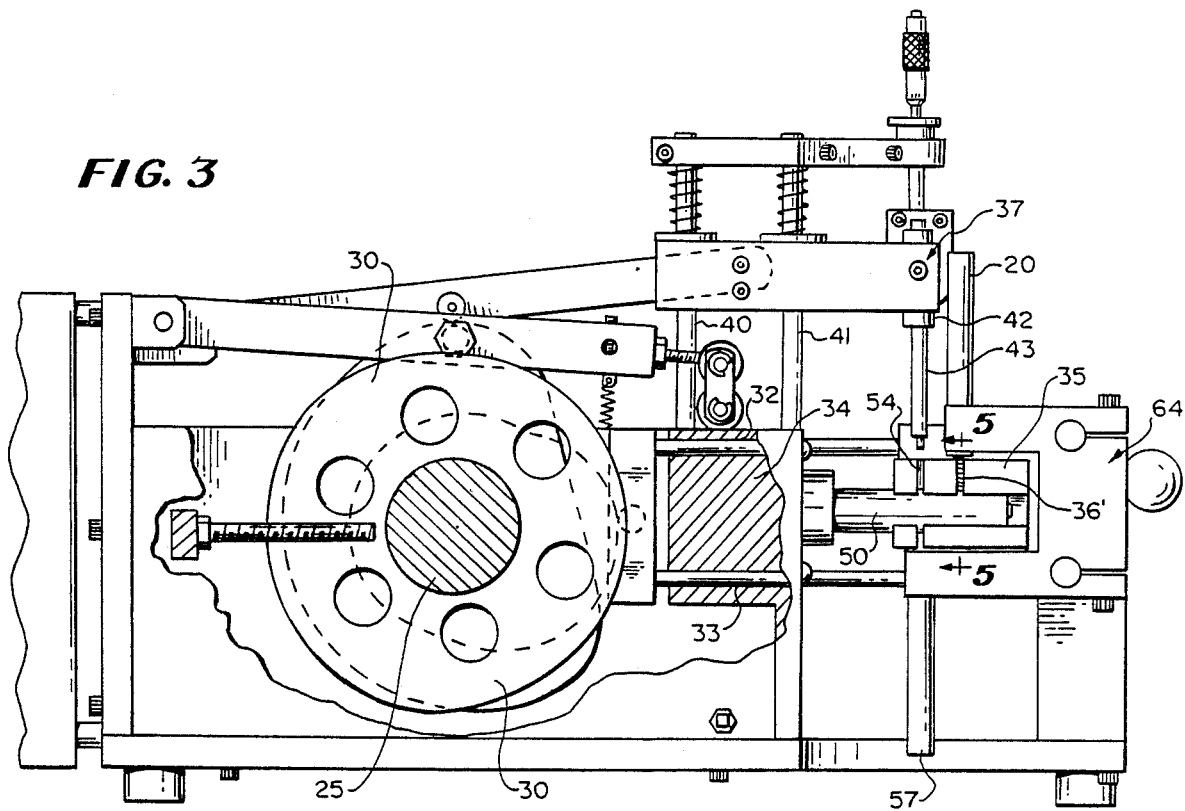
FIG. 3 is a fragmentary side elevation taken on line 3—3 looking in the direction indicated by the arrows as seen in FIG. 2.
Figure 9:
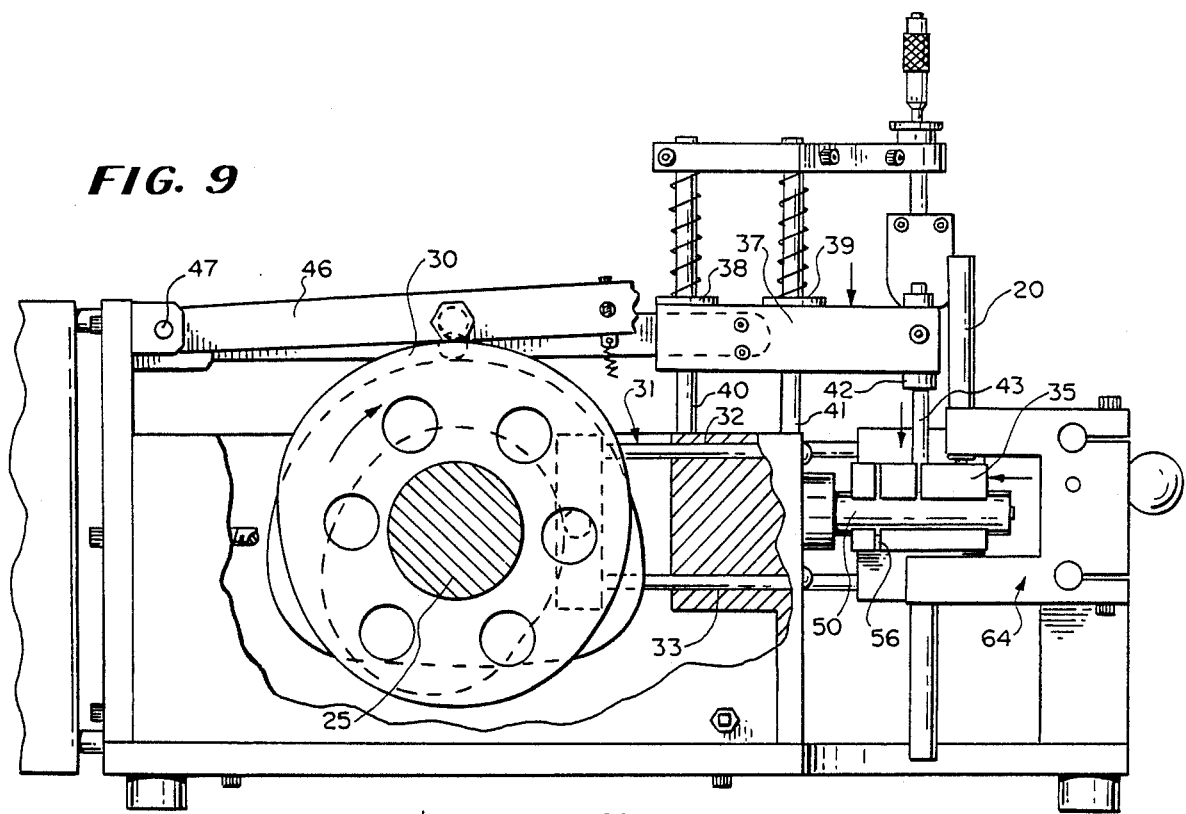
FIG. 9 is a fragmentary side elevation with parts broken away to show cams for rotating the nest when a disoriented part is received therein.
Figure 14:
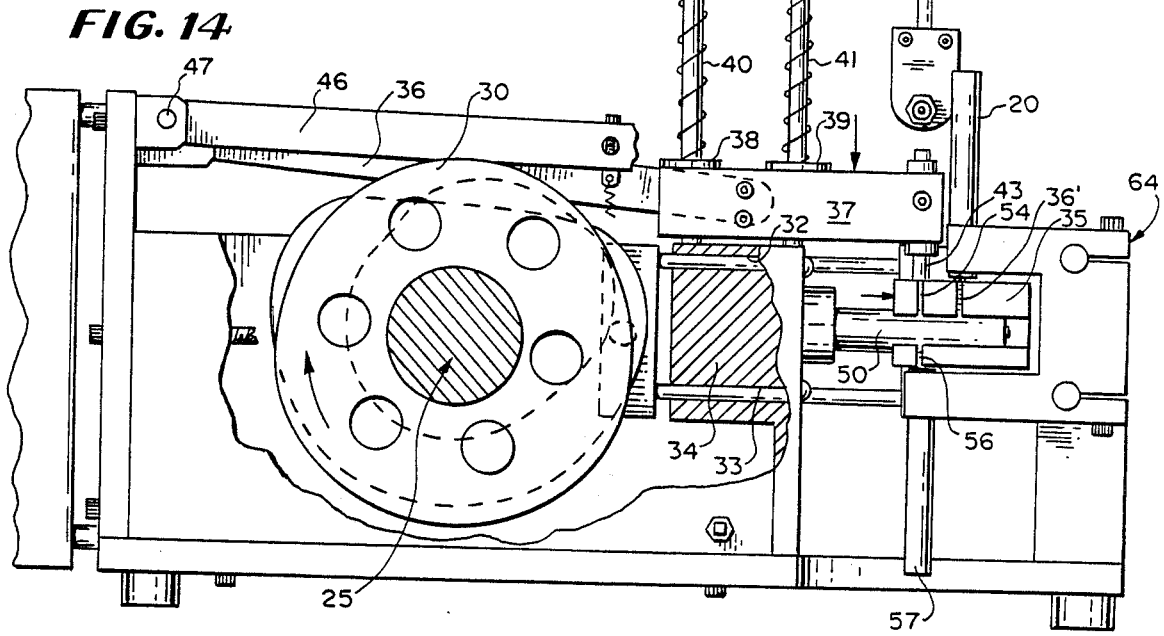
FIG. 14 is an enlarged fragmentary side elevation similar to FIG. 9 only showing the timing cams in a different position.
Figure 15:
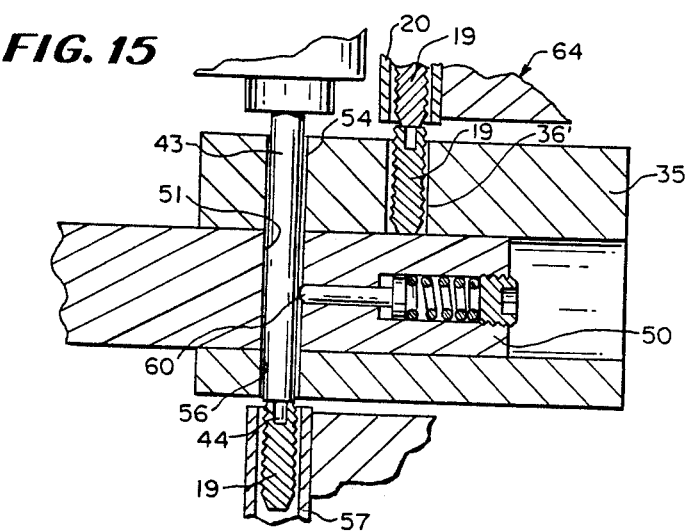
FIG. 15 is an enlarged fragmentary cross-sectional view similar to FIG. 13 only illustrating the way in which the plunger operates to positively engage the oriented part and to move the oriented part into the discharge chute.

The horizontal slide cam 28 (closes to the motor 27), directly controls a horizontal slide 31 (FIG. 9), which moves 0.500″ back and forth perpendicular to the axis of the drive shaft 25 and rides on linear ball bearings or horizontal slide bearings 32 and 33 (FIGS. 3 and 14) which are mounted to a main bearing block 34 (FIG. 3) in the front part of the machine. Onto this slide 31 is mounted a shuttle block 35 which has a vertical hole or passageway 36′ bored to a strategic depth, (slightly less than the length of a piece part 19), and diameter to accommodate a part. This hole 36′ in the shuttle block 35 is the first point of entry for the piece part 19.

The vertical slide cam or probe actuating cam 29 (center cam) has two rises (FIG. 16), two falls, and three dwells about its circumference in order to perform two functions in one cycle, one to probe the part 19 and the second to drive the part 19 out. The motion of the cam 29 is transferred thru a 2:1 multiplier arm or vertical slide actuator 36 mounted overhead and perpendicular to the drive shaft 25, into a vertically moving probe slide 37 which rides on two linear ball bearings 38 and 39 over hardened rods 40 and 41 that are fastened to the main bearing block 16 at the front of the machine.

The probe slide 37 has a hardened d&ill bushing 42 and a spring loaded cylindrical plunger 43 having a probe pin 44. The plunger 43 rides in the bushing 42. The center line of this pin 44 and bushing 42 is 0.500" offset from the center line of the entry tube 20.

The rack cam 30 thru an overhead 2:1 multiplier arm or rack slide actuator 45 is pivotally mounted at 46 (FIG. 1) perpendicular to the motor driven shaft 25 transfers the motion to a ball or rack slide 47 moving vertically. Onto this slide 47 is mounted a gear rack 48 which is meshed with a pinion 49. The rack cam 30 is such that the motion transferred from the cam, to the multiplier arm 45, to the ball slide 47, causes an orientor shaft or pinion shaft 50 to rotate 180° degrees. The pinion shaft 50 is mounted horizontally and perpendicular to the drive shaft 25. The pinion rides on two ball bearings mounted in the main bearing block 16 at the front of the machine. Into the orientor or pinion shaft 50 is mounted an orienting nest 51, which is parallel with the pinion and accommodates the parts or screws 19.

Mounted adjacent but beneath the pinion shaft 50 is a lockout slide 52 and a solenoid 53 (FIG. 7). Cooperable with the orientor or pinion shaft 50 and particularly with the orienting nest 51 is the shuttle block 35 and its axially spaced parallel shuttle block passageways or bores 54 and 36. The shuttle block bore 54 or passageway is also co-axially aligned with shuttle block discharge passageway 56 which in turn is connected to a discharge chute 57.

Figure 10:
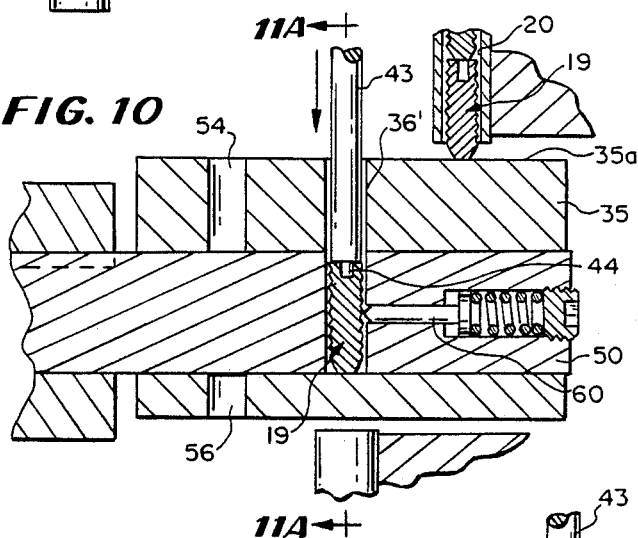
FIG. 10 is an enlarged fragmentary view showing the nest as the nest is being rotated and simultaneously moved from a parts receiving position to a parts discharging position.
Figure 11A:
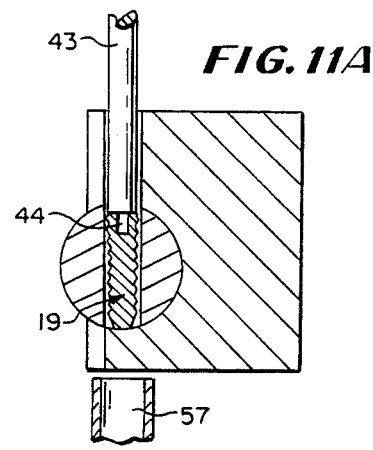
FIG. 11a is an enlarged partially sectioned view taken on line 11a—11a looking in the direction indicated by the arrows as seen in FIG. 10.
Figure 13:
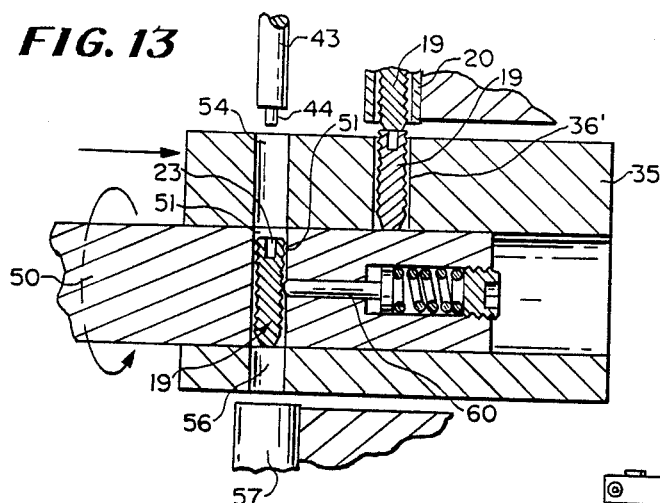
FIG. 13 is an enlarged fragmentary cross-sectional view similar to FIG. 12 only with the nest being shown in a rotated position and with the oriented part in alignment with the discharge chute preparatory to being discharged from the nest into the chute.

The set screws 19 are discharged from a vibratory feeder bowl not shown vertically in single file into the infeed tube 20, randomly oriented such that home of the screws have the points or threaded ends 21 loading and some with hex recesses 23 leading. From the feeder bowl, they enter the tube 20 which connects the feeding source to the orientor. At the staging point, the bottom part set screw 19 is contained in the hardened steel tube whose inside diameter is slightly larger than the set screw diameter. This screw 19 holds up the stack of screws in the tube 20. Also, regardless of the orientation of the screw, the bottom of it is supported by an outside surface 35a of the shuttle block 35 (FIG. 10). When this shuttle block 35 moves out 0.500", vertical shuttle block hole 36, which is slightly larger than the screw 19 O.D., is positioned directly underneath the screw on its centerline and allows the screw to fall in. At this position the slide dwells, the slide being attached to the shuttle block 35. The screw 19 falls into the vertical hole 36' in the shuttle block 35 from the indeed tube and stops when the part contacts the outer surface 50 of the shaft or the top of an outer diameter of the shaft carrying the orienting nest 51. The top of this diameter, and the top surface of the shuttle block are at a strategic distance (FIG. 13), (less than the length of the screw), to allow the bottom and only the bottom screw 19 to escape by peeling it away from the stack-up of screws when the slide begins its movement back into the probing position.

During the 0.500" movement the screw which is contained in the shuttle block 35 rides on the top of the orienting nest diameter (FIG. 13) until it reaches the probe position. Once staged in the probe position, the shuttle block slide dwells, and the screw is directly under the probe pin 44, and directly over a thru hole adjacent the orienting nest 51. The probe pin 44 moves down, contacts the screw 19 and pushes it out of the hole or passageway 36' in the shuttle block 35, and into the hole defining the orienting nest 51. The probe pin 44 which is spring loaded from the vertical slide 37, has a metal collar or flag 58 (FIG. 1) attached to its end (opposite the probe tip) which is used as a flag to signal a static proximity switch mounted from an adjustable bracket. This vertical slide overstrokes the distance actually required to position the screw 19. Because of this overstroke, when a screw is positioned with its hex recess 23 on top, the probe pins tip 44 will seat into this recess 23 and the flag 58 on the opposite end will signal a proximity switch 59 (FIG. 1). When the proximity switch 59 is energized it signals the solenoid 53 (FIG. 7) which is mounted under the bearing block to retract and move with it, the lock-out slide 52 which is positioned under the rack. This lock-out slide 52 obstructs the movement of the rack slide 48 and omits the 180° rotation of the pinion 49 and the orienting nest 51. This "omitting process" of "block out" is achieved because the rack slide 48 is cam actuated to the "home" position by the cam 30, (position of orienting nest when screw first enters it) but spring-loaded to the "180° turnover" position, so cam follower 30a (FIG. 2) leaves the perimeter surface of the cam 30 during the cam's fall, low dwell, and rise period (FIG. 16).

When a screw 19 is positioned upside-down with the hex recess 23 on the bottom, the vertical plunger 43 moves down to push the screw into the orienting nest 51, but now, the tip 44 of the spring-loaded probe seats in the "bottom" or threaded drive end 21 of the screw and the flag 58 on the opposite side does not travel far enough to energize the static proximity switch 59 (FIG. 1). In this condition the solenoid 53 and the lock-out slide 52 remain static and the rack 48 (FIG. 7) is allowed to move down and turn the pinion 49 and the orienting nest 51 so that the nest 51 rotates 180°. A manually operable cam switch 61 and a manually operable reset proximity switch 62 are provided (FIG. 2) to shut down the machine and to reactivate the electrical circuitry to the motor for emergency purposes.

During this probe sequence, the slide dwells for 15° of its rotation to allow the electronics to so their switching.

Figure 12:
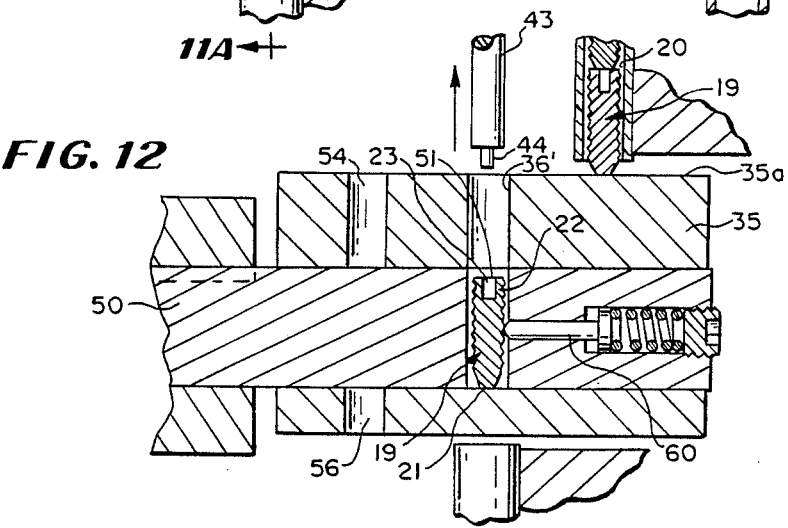
FIG. 12 is an enlarged fragmentary cross-sectional view similar to FIG. 10 only with the plunger being removed from the nest in the receiving block.
Figure 11B:
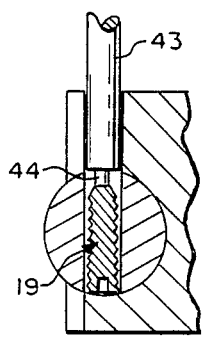
FIG. 11b is an enlarged fragmentary detail view similar to FIG. 11a only with the part in the nest rotated in an upside down position.

When the probe slide finishes its movement up, and begins dwell, the rack slide 48 will either "over and turn the screw 180° or have it's movement omitted by the solenoid 53 if it is already in the proper orientation. The screw 19 which is in the orienting nest 51 is captured by a spring-loaded nest pin 60 (FIGS. 10 and 12) which helps to keep it seated during the 180° turnover (if deeded). During this same period, that the rack is activated the horizontal slide 32, which now has no part in its vertical bore, moves out 0.500" to pickup an awaiting screw. Here it dwells allowing a new screw to fall into its vertical hole. Located 0.500" from this vertical hole is yet another clearance thru-hole. While this slide is in the dwell position the probe pin 23 moves down again, this time pushing the now oriented screw 19 from the orienting nest 51, thru the passageway 56 bottom portion of the shuttle block 35, and into the discharge tube.

From there it travels into a machine, screw driver, or into packaging.

Sequence of Operation

The infeed tube accepts a stack-up of randomly oriented piece parts 19 from the tube or magazine 20. The first piece part 19 is staged with its leading end in contact with the top of the shuttle block 35. At this position its outer surface is contained by the inner surface of the infeed tube 20. A 360° timing dial 63 is mounted to the shaft 25 (FIG. 1) and the following description has reference thereto.

195°–315°

When the shuttle block 35 moves into its furthest position away from the cams 28, 29 and 30, a bore 36 in its top surface is positioned on center line and directly underneath the stack of parts 19. This allows the first piece part to drop into the bore due to back pressure from the stack of piece parts. The piece part will drop until its leading end contacts the orienting nest 51. The top of the orienting nest and the top surface of the shuttle block 35 are at a strategic spacing, which allows the piece part to exit completely out of its surrounding confinement and yet restricts any further piece parts from exiting this confinement.

315°–360°

The piece part 19, now captive in the shuttle block bore 36 is escaped from the rest of the stack, and is moved toward the probe/expel position. During this travel, its leading edge remains in contact and rides on the top surface of the orienting nest diameter or shaft 50.

The rack slide travels to its up (home) position, causing the rack to rotate the pinion shaft and orienting nest 180° in preparation for a new probing cycle.

If the previously processed piece part required no 180° orientation, the rack slide would have remained in its up (home) position throughout the entire cycle.

0°–60°

The piece part 19 now positioned over the bore in the orienting nest.

The part is no longer supported on its leading edge. The probe punch which is spring-loaded and attached to the vertical slide moves downward contacting the piece part and driving it by the interference pin into the orienting nest's bore until the piece part's leading end bottoms out against the bottom of the inside diameter of the shuttle block.

The interference pin captures the piece part and prevents it from being launched if 180° turnover is required.

60°–75°

The vertical slide will stroke to a fixed height every cycle. Because the piece part has a recess, blind hole or spot-face on one end, the spring-loaded probe punch will be retracted to one of two different levels dependent on the orientation of the part being probed.

Opposite the contact end of the probe punch is the switch flag. When a piece part is positioned with its recess 23 on top, the tip of the probe punch or plunger pin will seat into this recess 23 (FIG. 5). This will cause no retraction of the spring-loaded probe punch, and in return will allow the metallic switch flag 58 to travel to a level that will energize the statically mounted probe proximity switch 59. This will send a signal to the control circuit when a piece part is positioned with the recess on its bottom end, the tip 44 of the probe punch will be contacting its solid or less recessed end 21, and this will cause the probe punch or plunger 43 to retract, which will cause the switch flag to dwell at a level higher than the probe proximity switch, never energizing it.

The dwell is designed into this section of the cycle to allow the electronics ample time for receiving a signal (if present), during very high speed operation.

75°–135°

The vertical slide rises and brings the probe punch or plunger 43 back up into its "home" position.

If a signal was given to the probe proximity switch, the solenoid 53 would be energized to actuate the lock-out slide 52 into position for omitting any downward travel of the rack slide.

135°–195°

The horizontal slide travels, empty of parts, to its furthest position away from the cams.

If no signal was received during the probing process, the rack slide travels down, causing the rack to rotate the pinion and the now, piece part loaded, orienting nest 180°.

If a signal was received during the probing process, the lock-out slide 52 would restrict any downward motion of the rack slide causing the cam follower on the rack slide actuator to leave the surface of the cam, thereby eliminating the 180° turnover process.

195°–255°

The piece part will now be oriented with the recess on its top end, regardless of how it originally entered the mechanism.

The shuttle block 35 which is now accepting a new piece part 19 from the infeed tube 20, has a thru bore 36 positioned on the center line of the probe punch and now oriented piece part. This thru bore allows the probe punch 43 to go thru and positively drive the oriented piece part, thru the orienting nest bore, thru the bottom half of the shuttle block bore 56 and out of the mechanism into the outfeed tube 57.

255°–315°

The vertical slide brings the probe punch to its "home" position.

The three driving cams and the motor speed are directly attributable to the speed of this machine for the following two reasons:

(1) Since the cams and drive shaft are constantly rotating members, flywheel energy is stored during the dwells, which becomes available during the rises and falls. This eliminates the high acceleration torque normally required in a start/stop or single revolution drive. This also eliminates high "break-away" forces encountered in pneumatic and hydraulic cylinder drives.

(2) The radial displacement, for every degree on all three cams, is mathematically derived from formulas resulting in a modified sine motion for all of the rises and falls. The modified sine acceleration/deceleration curve combines low acceleration with a gradual transition from acceleration to deceleration to provide a smooth motion necessary for not only higher cycle speeds, but also to prevent the cam followers from "floating" off of the cam's perimeter surface.

Controls

The probe proximity switch 59 is "live" only during the probing process because it is wired in series with another proximity switch, the cam switch.

This cam switch is only on when the switch cam's major radius is energizing it (0°–120°). The above being done because the vertical slide cam has 2 rises and 2 falls, (one for probing, the other for expelling). The switch flag 58 would trigger the probe proximity switch during the expelling process (195°–255°) causing the solenoid to energize and actuate the lock-out slide. This would be undesirable.

If the probe proximity switch receives a signal, the solenoid will retract and stay retracted until the reset proximity switch receives a signal from a metallic screw head, to unlatch the solenoid in preparation to beginning a new probing process.

The machine 10 and the method disclosed can be used to orient a number of different types of parts such as screws, cylindrical parts having a recess in one end, parts having recesses at opposite ends each having a different depth, slotted set screws, hex set screws, recessed caps, parts with a dish on one end or at both ends of the dishes have different depths. It will be further appreciated tat if different parts are to be oriented, a differently dimensional shuttle block and shaft carrying the orienting nest can be substituted by quickly removing fasteners holding these components in operating position on my machine. The orienting nest has a quick release clamping collar to permit it to be attached and removed. The shuttle block can be attached and/or removed by operating two screws.

The new methods of orientating parts has been described in combination with the foregoing operating description and a further detailed description is believed to be unnecessary.

Summary of Unique Features

1. Probe Punch Serves Two Purposes:
   (A) Forces piece part past the interference pin during its downward travel (eliminating the need to rely on gravity free fall) 0°–60°.
   (B) During this low dwell (60°–75°) the end opposite the probing tip is used to signal a proximity switch only if the piece part being probed is oriented with its recess on top. This is done by attaching a collar and sensing its level.
2. Piece part is positively positioned throughout all escaping, probing, orienting and expelling processes, from the time it enters this mechanism, until it is driven out. As long as all parts on the machine are functioning, the piece part will be forced to its correct positions throughout the process of cycle.
3. After the low dwell (60°–75°), the electrical switching circuit and the solenoid actuated lockout slide will have additional time (70° of rotation) 75° to 145° to perform their function because the 60° of rotation required to bring probe punch up to "home position", before the rack slide begins its downward travel. This electro-mechanical arrangement is highly advantageous, and embodies one of the important features of my invention, in giving me time range needed to permit the machine to be operated at higher RPM's (speed) to increase production.
4. During the 120° of rotation required to expel the now oriented piece part (see FIG. 16), the horizontal slide dwells allowing a new piece part to fall into the shuttle block (195°–315°), hence it will be seen that the 120° dwell time serves two functions: the 1st being to provide ample time to permit the oriented piece part to be expelled. The 2nd to permit the new piece part to fall into pre-sensing condition, anticipatory of being axially moved with the shuttle block to its sensing position.
5. Shuttle block s reciprocating motion delivers the piece part to the orienting nest, then returns empty to pick up new part. It is significant to note that during the time when the nest is being rotated to correctly orient a disoriented part, the shuttle block is in its return stroke period of operation for accepting a new part. It will be further noted that, during the time when the nest is being rotated to its original position (315°–360°) the shuttle block is in its escaping stroke delivering a new piece into the probe position.

I claim:

1. A parts orienting machine comprising a frame, a reciprocating block mounted on the frame with a pair of side-by-side vertically extending parts inlet and outlet passageways therein and reciprocal with said block, one of the passageways being in periodic co-axial alignment with an inlet parts feeder chute for receiving disoriented piece parts on a one at a time basis, the other of said side-by-side vertical passageways being in periodic vertical alignment with a discharge chute for conveying oriented parts to the discharge chute, a vertically actuatable plunger successively engageable in said side-by-side passageways, the shuttle block having an axial passageway, an axially extending orientor shaft extending into said axial passageway, a vertically extending parts receiving nest in said orientor shaft in periodic vertical alignment with the reciprocating side-by-side vertical passageways, means for reciprocating the shuttle block back and forth for successively aligning said nest with said inlet and outlet passageways, sensing means for sensing whether a part received from the feeder chute in said nest is properly oriented relative to other parts, means responsive to said sensing means for rotating said orientor shaft and said nest only when said part is received in an upside down disoriented position in said nest, and means for timed operation of said plunger enabling the plunger to assist in locating the part in the nest and discharging an oriented part from the nest.

2. The machine of claim 1 further characterized by said plunger being positively engageable with the part as it is received in the nest to assist in locating the part in the nest and for again engaging the part after the art has travelled to its discharge position to positively contact and provide an assist when needed to dislodge the oriented part from the nest into the discharge chute.

3. The machine of claim 1 further characterized by the reciprocating block being mounted upon the axially extending orientor shaft and being movable back and forth upon the shaft for successively causing its passageways to become radially aligned with the nest, the inlet chute being vertically alignable with the vertical passageway while the other vertical passageway is in alignment with the nest enabling a random part to be loaded into the nest while an oriented part is being discharged into, the discharge chute.

4. The machine of claim 1 further characterized by the side-by-side vertical passageways being positionable in timed relationship so that when said one of the vertical passageways is reciprocated to a position at one side of the nest it then becomes radially aligned with the inlet chute for receiving another part, and at the same point in time, when one of the vertical passageways is aligned with the inlet chute said other of the vertical passageways is aligned with the nest so that the plunger can then enter said other of the vertical passageways and the nest to discharge the oriented part into the discharge chute.

5. The machine of claim 1 further characterized by the block having its vertical passageways arranged in radially spaced aligned pairs and positioned on radially opposite sides of the nest in the axially extending orientor shaft and with the plunger being operable to extend through a pair of the radially spaced vertically aligned passageways as well as through the nest to completely dislodge the oriented part and to cause it to fall into the discharge chute.

6. The machine of claim 1 further characterized by the said means responsive to the sensing means being operable to rotate the orientor shaft and the nest 180° only when the part is received in an upside down disoriented position in the nest at a point in time when said one of the passageways is being loaded with another random part from the feeder chute.

7. The machine of claim 1 further characterized by said sensing means being located on a tip end of said plunger so that as the plunger is moved to the nest after the nest has first received a random part, the sensor can determine whether the random part is in an oriented or a disoriented position relative to the other parts that have been previously oriented by the machine operation.

8. The machine of claim 1 further characterized by the shuttle block and the orientor shaft being interchangeable with another shuttle block and orientor shaft having passageways and a nest with varied sides to permit varied types of parts to be oriented.

9. The parts orienting machine of claim 1 further characterized by including a motor mounted on the frame having a driven shaft, three successive cams mounted in axially spaced relation on the shaft, a first of the cams being cooperable with said means for timed operation of the plunger and being operable to assist in the movement of the plunger up and down, a second of the cams being operable to assist in the reciprocation of the shuttle block, and the third cam being operable to assist in the rotation of the orientor shaft and the nest to orient the part when signalled by the sensing means to do so.

10. The parts orienting machine of claim 1 further characterized by the machine including an electrically powered motor, said means for timed operation of said plunger comprising a cam operably connected and driven by said motor first assisting in locating the part in the nest and the plunger then being actuated a second time to discharge an oriented part from the nest.

11. The parts orienting machine of claim 1 further characterized by including a motor mounted on the frame having a driven shaft, said means for reciprocating the shuttle block comprising a cam operably connected to the driven shaft and with the cam being actuatable in timed relationship with the plunger while the plunger is in its dwell cycle.

12. The parts orienting machine of claim 1 further characterized by including a motor mounted on the frame having a driven shaft, said means responsive to said sensing means for rotating said orientor shaft and said nest only when said part is received in an upside down disoriented position in said nest comprising a cam operably connected with the driven shaft and with said cam being only actuatable during the periods when said plunger is disengaged from said nest.

13. A method of orienting parts where the parts are of a similar shape each having a head end and a tail end comprising the steps of successively placing parts one by one into a first radial slot on a shuttle block, moving the shuttle block axially radially aligning the first radial slot with the nest, causing a plunger to enter the first slot and to positively move the part into a nest while operating a sensor to determine whether the ends of the part are properly oriented relative to one another in the nest, retracting the plunger, only rotating the nest to reorient a disoriented part when a part is disoriented, causing the plunger to enter a second radial slot on the shuttle lock, to positively expel the oriented part from the nest after the second radial slot and the nest have been radially aligned, contemporaneously rotating the empty nest 180° to its original position only if the part had been sensed and found to be disoriented while moving the shuttle block axially to its part loading position.

14. The method of claim 13 further characterized by the sensing of the part cavity with a sensor probe during a low dwell (60°–75°) with an end opposite a probing tip of the sensor probe issuing a signal to a proximity switch only if the piece part being probed is oriented with its recess on top.

15. The method of claim 13 further characterized by maintained the piece part positively positioned through out all escaping, probing, orienting and expelling steps from the time the part is moved out of the continuous line until the part is moved away.

16. A parts orienting machine comprising a frame, an infeed parts conveyor for conveying parts to the machine, an axially moving shuttle block, a parts receiving passageway in the shuttle block periodically in parts receiving communication with the infeed conveyor, a parts receiving nest periodically in co-axially alignment with the parts receiving passageway, a plunger probe, means for reciprocating the lunger probe in the parts receiving passageway to successively force each into the nest, means for holding the part in the nest, the plunger probe being operatively connected to a sensor means to determine whether the part is upside down or right side up, nest rotating means responsive to said plunger probe to rotate the nest 180° when the part is upside down, said means for reciprocating the plunger probe being operable to positively contact the sensed oriented part and to positively engage and push the part free of the means holding the part and free of the nest to cause the part to move into a discharge chute for receiving identically oriented parts, said nest being positioned in an axially extending shaft mounted interiorly of said axially movable shuttle block, the block being movable axially along the shaft.

17. The machine of claim 16 further characterized by said sensor means and said nest rotating means including a solenoid and a lockout slide actuatable by said solenoid for preventing the nest from being rotated when the sensing means determines that the part in the nest is properly oriented.

18. The machine of claim 16 further characterized by said nest rotating means including a rack, a pinion gear operable by the rack, the pinion gear being connected to said nest for rotating the nest on command.

19. The machine of claim 16 further characterized by said nest rotating means including a rack, a pinion gear operable by the rack, the pinion gear being connected to said nest for rotating the nest on command, a solenoid connected to said sensing means, and a lockout slide actuatable by said solenoid for preventing the rack from rotating the pinion gear and preventing the nest from being rotated when the sensing means determines that the part in the nest is properly oriented.

20. The machine of claim 16 further characterized by including a motor on said frame, a motor driven drive shaft, three co-axially mounted cams on said motor driven drive shaft for operating the machine, one of said cams being connected to said plunger for reciprocation of the plunger in timed relation.

21. The machine of claim 16 further characterized by including a motor on said frame, a motor driven drive shaft, three co-axially mounted cams on said motor driven drive shaft for operating the machine, one of said cams being connected to said plunger for reciprocation of the plunger in timed relation, another of the cams actuating said nest rotating means in timed relation, and a third of the cams co-acting with said nest rotating means to orient upside down part relative to previously discharged parts.

22. The machine of claim 16 further characterized by the sensing means and said nest rotating means including a solenoid and a lockout slide actuatable by said solenoid for preventing the nest from being rotated when the sensing means determines that the part in the nest is properly oriented, the sensing means and the solenoid actuated lockout slide being provided with additional time in the cycle of operation of 75°–145° to perform their function because only 60° of rotation is required to move the plunger probe back from its probing position to its "start position".

23. The machine of claim 16 further characterized by means for moving the shuttle block from its parts receiving "home position" from the infeed conveyor to its parts discharging position when in co-axial alignment with the nest for said plunger probe to move the part from the parts receiving passageway in the shuttle block into the nest.

24. The machine of claim 27 further characterized by means for moving the shuttle block from its parts receiving "home position" from the infeed conveyor to a parts discharge position when in co-axial alignment with the nest for said plunger probe to move the part from the parts receiving passageway in the shuttle block into the nest, said means for moving the shuttle block being timed to move the shuttle block back to its "home position" so another part can be received in its parts receiving passageway while the nest is being rotated to orient the part to accelerate processing of parts.

25. A parts orienting machine comprising a frame, a infeed parts conveyor for conveyor parts to the machine, an axially moving shuttle block, a parts receiving passageway in the shuttle block periodically in parts receiving communication with the infeed conveyor, a parts receiving nest periodically in coaxially alignment with the parts receiving passageway, a plunger probe, means for reciprocating the plunger probe in the parts receiving passageway to successively to force each into the nest, means for holding the part in the nest, the plunger probe being operatively connected to a sensor means to determine whether the part is upside down or right side up, nest rotating means responsive to said plunger probe to rotate the nest 180° when the part is upside down, said means for reciprocating the plunger probe being operable to positively contact the sensed oriented part and to positively engage and push the part free of the means holding the part and free of the nest to cause the part to move into a discharge chute for receiving identically oriented parts, said nest being positioned in an axially extending shaft mounted interiorly of said axially movable shuttle block, the block being movable axially along the shaft, the parts receiving pasageway extending through said shuttle block enabling a part to be received therein and moved axially into aligned relation to said nest whereupon the means for actuating the plunger is timed to push the part from the passageway in the shuttle block into said nest.

* * * * *